Figure 4:
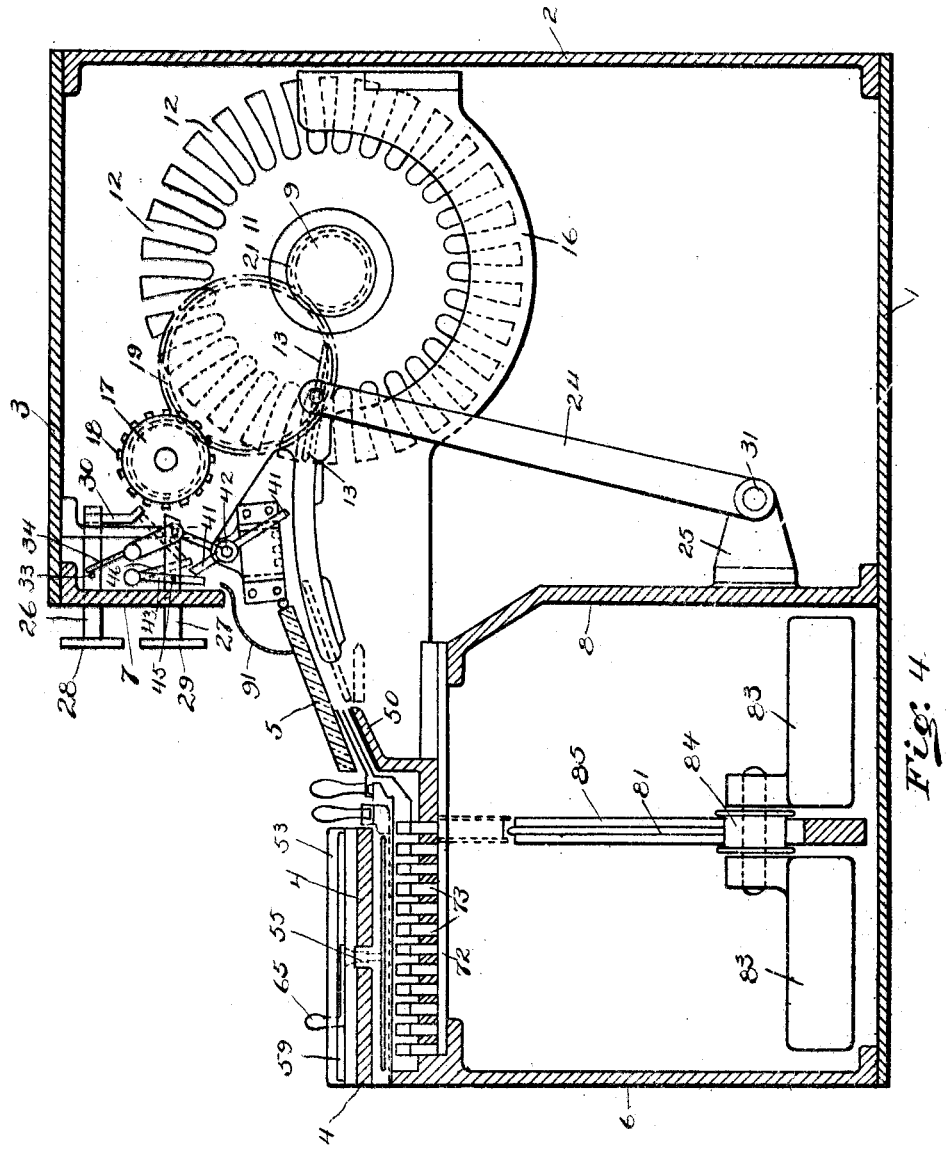

W. S. JOHNS.
COMPUTING MACHINE.
APPLICATION FILED MAR. 1, 1909.
1,048,973.
Patented Dec. 31, 1912.
6 SHEETS—SHEET 1.
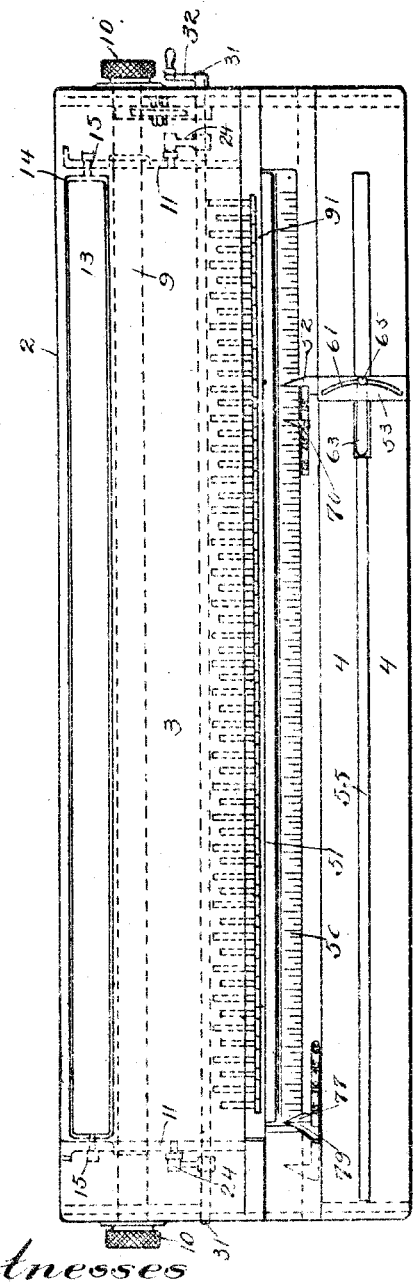
Witnesses
C. M. Fahnestock
Marston Allen
Inventor
William S. Johns
by Alfred M. Allen
Attorney

W. S. JOHNS.
COMPUTING MACHINE.
APPLICATION FILED MAR. 1, 1909.

1,048,973.

Patented Dec. 31, 1912.
6 SHEETS—SHEET 2.

Witnesses
C. M. Fahnestock
Marston Allen

Inventor
William S. Johns
by Alfred M. Allen
Attorney

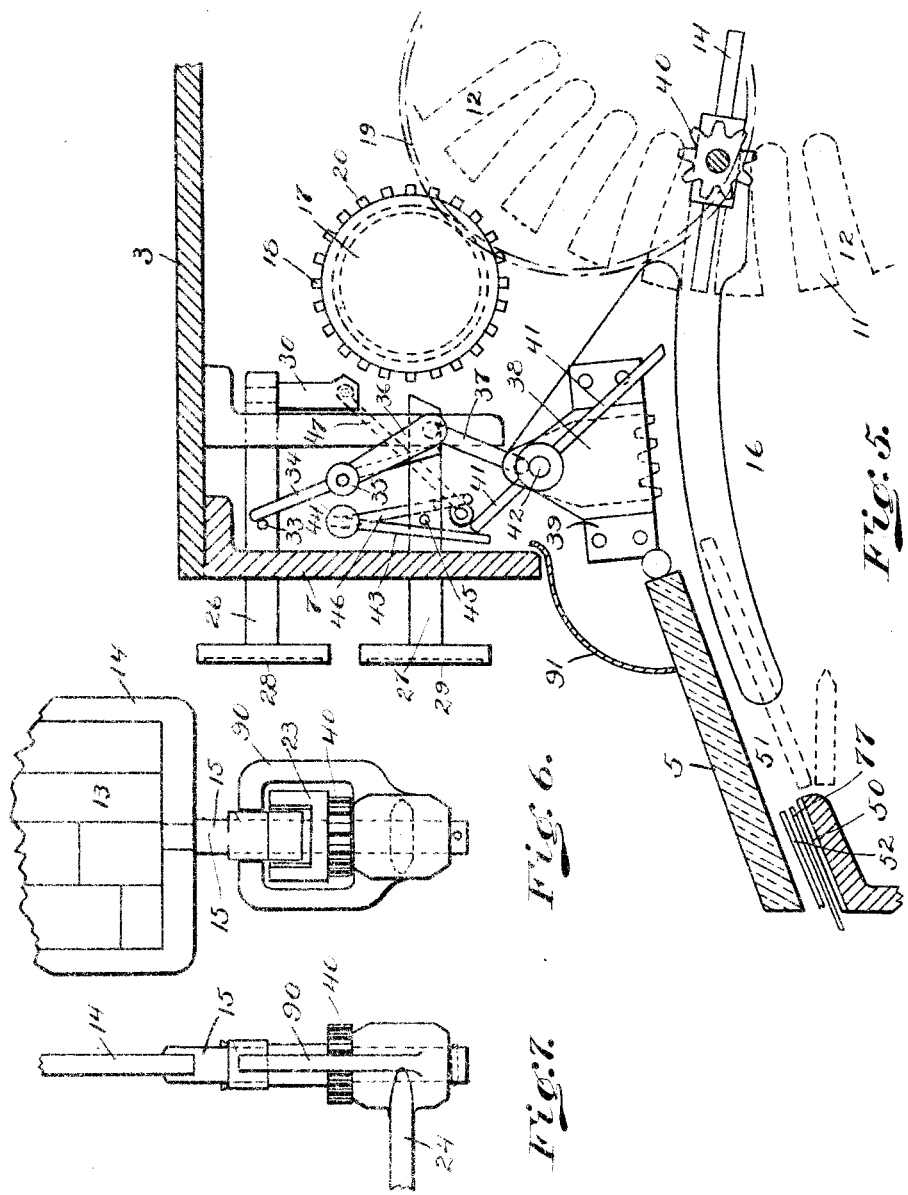

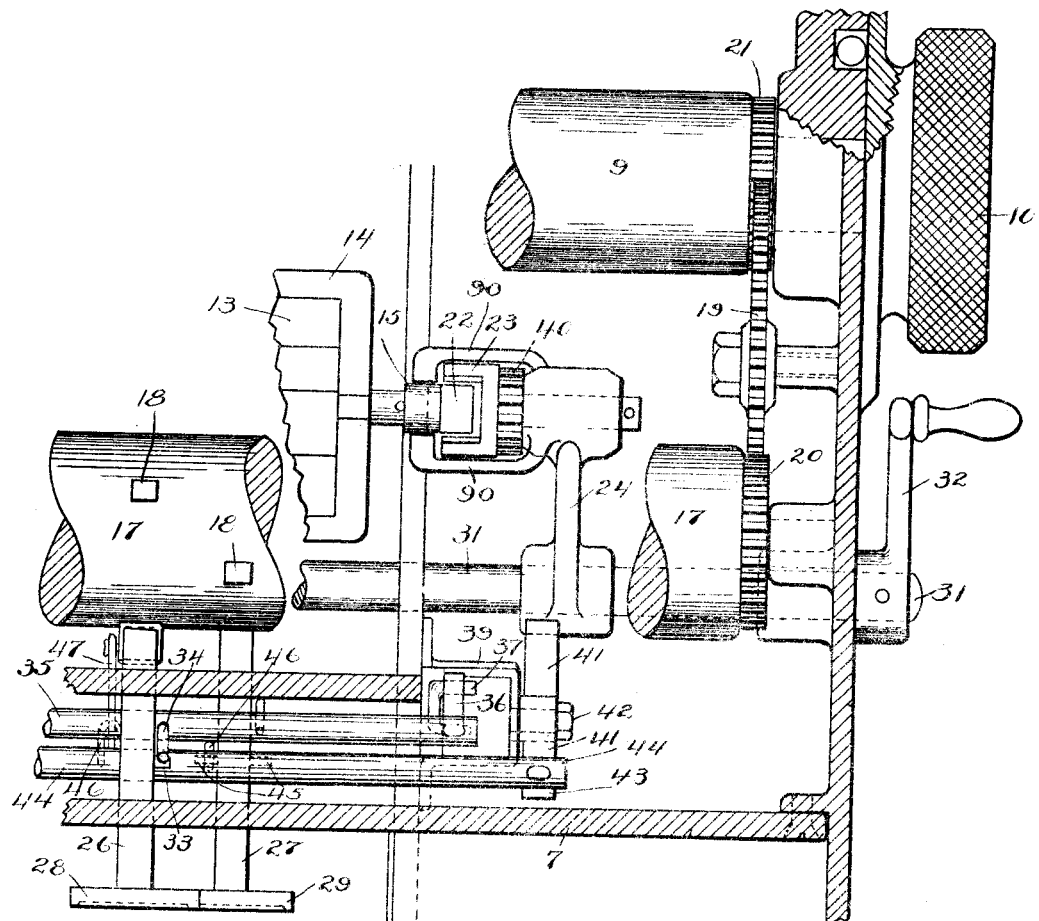

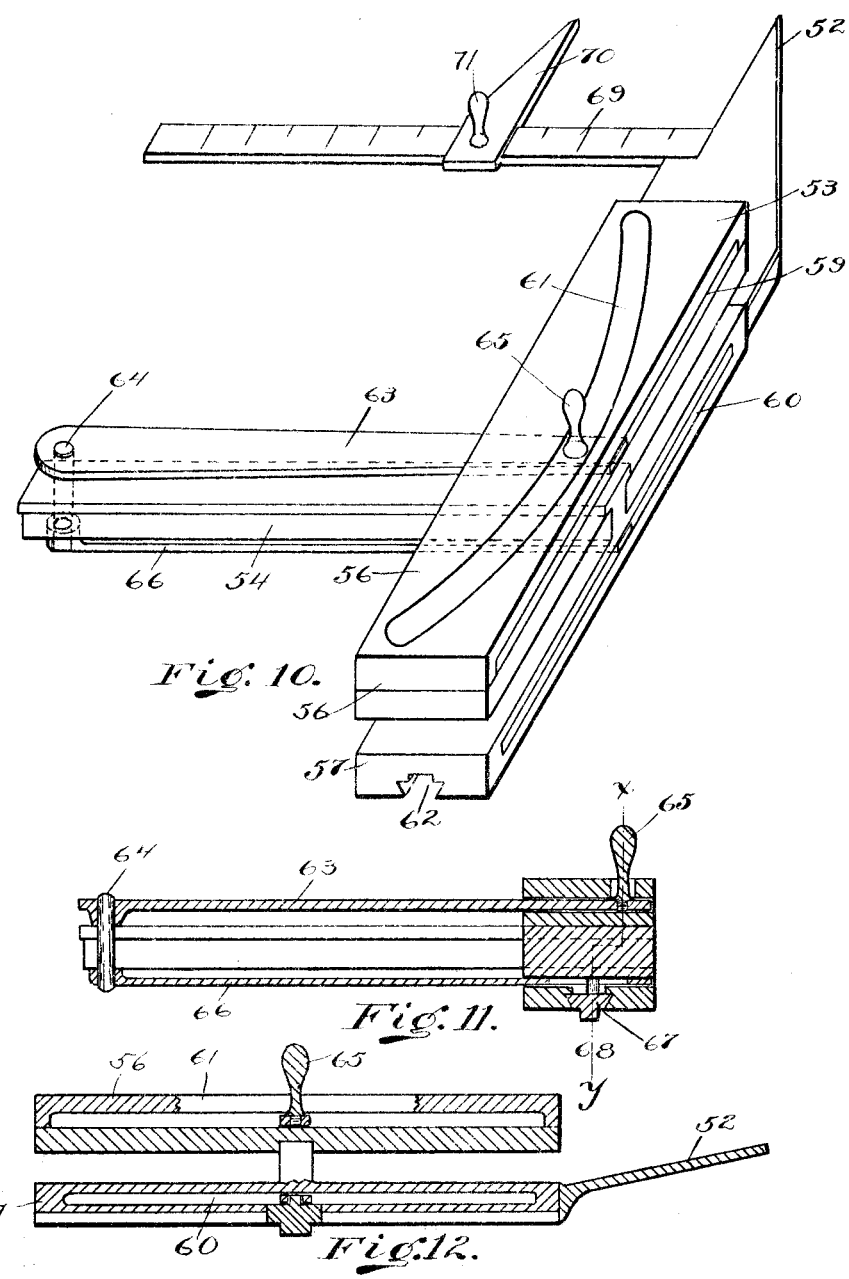

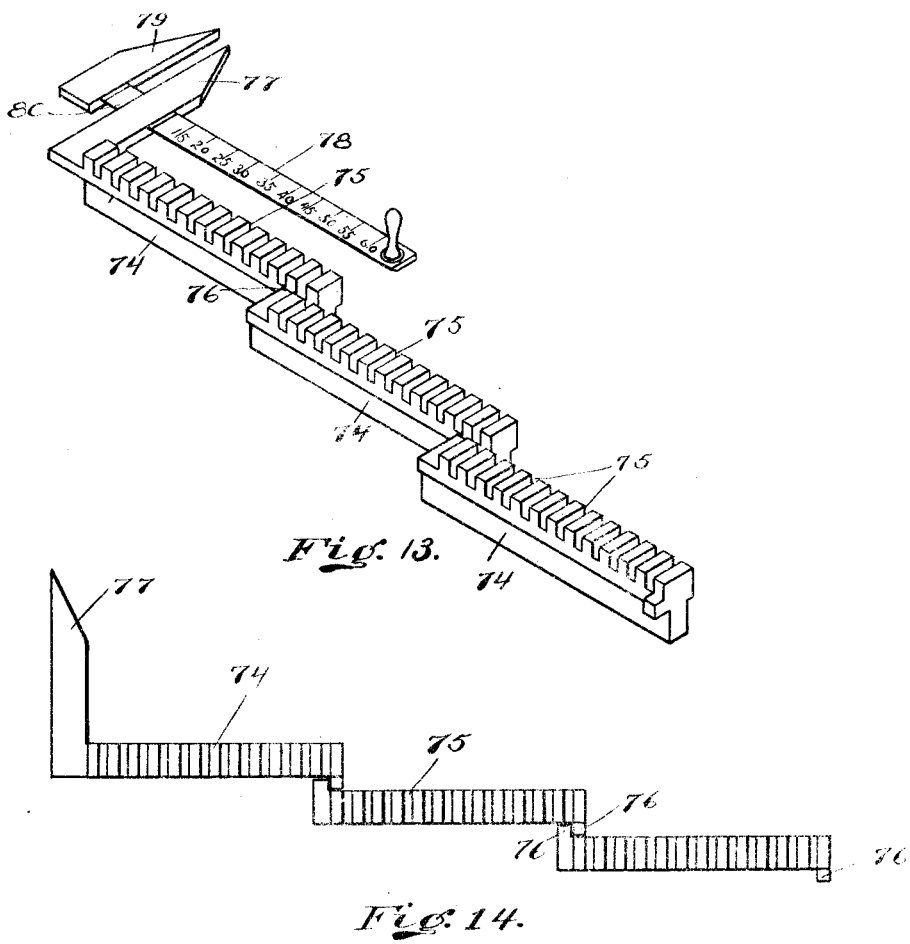

UNITED STATES PATENT OFFICE.

WILLIAM S. JOHNS, OF NORWOOD, OHIO.

COMPUTING-MACHINE.

1,048,973.                Specification of Letters Patent.         Patented Dec. 31, 1912.

Application filed March 1, 1909. Serial No. 480,545.

*To all whom it may concern:*

Be it known that I, WILLIAM S. JOHNS, a citizen of the United States, residing in Norwood, in the county of Hamilton and State of Ohio, have invented certain new and useful Improvements in Computing-Machines, of which the following is a full, clear, and exact description, reference being had to the accompanying drawings, forming part of this specification.

The object of my invention is to furnish a machine for the computation of wages, interest and the like, and the machine is more especially designed for determining at a glance, the amount of wages due for any fractional part of an hour, day or week, at any desired rate of wages, the machine being designed for indicating the amount at any desired rate for fractional periods of time covering each five minutes of a twelve hour day.

In order to economize space, the various computations are mounted on cards, or plates made of any suitable material, each card containing on front and back, or on two cards or plates secured back to back, computations for different rates of wages for each five minute period up to twelve hours, and for each hour thereafter up to sixty hours.

Mechanism is provided for presenting the proper card for the selected rate of wages at a sight opening, and provision is made for presenting either the front or reverse side of the card depending on whether the computations for the selected rate are found on the front or back of any card.

In connection with the card containing the computations, a fixed scale is provided indicating each five minute period, and a sliding pointer is arranged to be employed in connection with the proper card to indicate the exact sum due for any period of time at the given rate for which computation is to be made.

Provision is also made for deducting from the time to be computed the lunch hour, and provision is also made for indicating the proper computation when the wage earner does not commence his work at the usual time.

My improvements consist of that certain novel construction and arrangement of parts to accomplish the above results in the manner to be hereinafter particularly pointed out and claimed.

In the drawings Figure 1 is a plan view of my improved machine. Fig. 2 is a side elevation of same. Fig. 3 is a plan view of one side of one of the cards containing the exact computation. Fig. 4 is a central vertical cross section of the machine. Fig. 5 is a detailed cross sectional view illustrating the method of selecting and presenting the desired card at the sight opening. Fig. 6 is a plan view of a detail of one end of one of the cards, with its connecting mechanism. Fig. 7 is a side elevation of same. Fig. 8 is a detail plan view partly broken away and considerably enlarged, illustrating mechanism for selecting the desired card from the holder. Fig. 9 is a detail showing the ball ratchet in section and the end elevation for locking the card holder against back movement. Fig. 10 is a perspective view of the sliding pointer construction for indicating the computations. Fig. 11 is a longitudinal section of same. Fig. 12 is a cross section on the lines $x-y$ of Fig. 11. Fig. 13 is a perspective view of the pointer construction for automatically deducting the lapsed time. Fig. 14 is a plan view of same.

The operating parts are inclosed in an L-shaped box consisting of a base 1, back wall 2, and top plate 3, for the vertical extension of the case, top plate 4 for the front of the case including a glass plate 5, through which the cards are exhibited, and front walls 6 and 7 and an intermediate partition 8, for the casing.

Mounted horizontally in the vertical portion of the case in the side walls, is a shaft 9, which is rotated by finger buttons 10, 10 from either side of the case. This shaft carries at each end disks 11, 11 secured thereon, and these disks are provided with a series of radial slots each designed to hold a card 13 upon which the computations are made. These cards are preferably each provided with a binding frame 14, and the frames are provided with trunnions 15, 15 to rest in the slots 12, 12. In order to prevent the frames and cards from falling out of the slotted holder, as the holder is rotated, a sheet metal shield or guard plate 16, with side flanges is provided to inclose the lower half of the holder. Each of these cards for the particular purpose for which I have designed my machine, contains four horizontal rows of computations as illustrated in Fig. 3. The two lower rows contain the computations for the amount of wages at any selected rate, for each five minutes of time up to twelve hours. The uppermost row indicates each hour from 13 to 60, and the figures in the row next the top contain the computations for the indicated hours at the selected rate. Each card is provided with these computations on the front and reverse side, but at a different wage rate, and as there are thirty cards in the embodiment of my invention as illustrated we will, therefore, have the computations for sixty different rates of wages. Of course, it will be understood that machines of various sizes can be constructed in which the number of cards and computation rates can be largely increased.

In order to select the proper card containing the computations for the desired wage rate, I provide as follows: 17 is a cylinder mounted horizontally in the casing and provided with a series of radially extending and spirally arranged lugs 18, two for each of the thirty different cards, and this cylinder is geared to the idler gear 19 by a gear 20, and the idler is geared with the gear 21 on the shaft 9 as shown in Fig. 8. The lugs 18 on the cylinder 17 are so arranged with reference to the slots 12, in the cylindrical card holder, that when any particular lug reaches a certain position, the proper card for that lug will rest its trunnion head 22 in the slotted holder 23, which is mounted on the end of a lever arm 24 pivoted in a bracket 25 on the partition wall 8 near the bottom of the case.

In order to stop the cylinder 17 at the proper point, and thus through the train of gearing 19, 20 and 21 to stop the cylinder holder at the proper point, I provide as follows: Projecting through the front wall 7 of the case are two series of horizontally arranged push pins 26 and 27, provided with heads 28, 29 upon which heads are indicated the various rates of wages, there being sixty of these push buttons in the two series, the upper series having relation with the front faces of the computation cards, and the lower series having relation to the reverse side of these cards.

The operator pushes in the proper push button for the rate desired, and that projects the inner end of the pin 27 in the pathway of the proper lug 18, or for the push pins 26, projects the depending arm 30 in the pathway of the proper lug 18. In this way the card holder will be stopped at the proper point with the ends of the trunnions of the cards resting in the slotted holders 23, carried by the arms 24, mounted on the rock shaft 31 at the bottom of the case. This rock shaft 31 is actuated by the hand crank 32 outside the case, and carries the selected card with the swing of the lever 24 forward toward the front of the case.

As the computation cards carry the computations on both sides, it will be necessary to reverse the card whenever the wage rate selected appears on the reverse side of the card, in order to display the proper set computations through the glass window 5.

Each pin 26 carries a stud 33 which rides in the pathway of the lever 34, mounted on a rock shaft 35, which shaft is connected at either end with toggle levers 36, 37, the toggle levers in turn carrying the depending racks 38, at either end and arranged to slide vertically in suitable guide blocks 39. As the push pin 26 is pushed in, the toggle levers will be straightened out and depress the racks 38, so that they will be engaged by the gears 40 mounted on and a part of the holders 23, pivotally mounted on the ends of the rock levers 24. As the hand crank 32 is turned, therefore, this engagement of the pinions 40 with the racks 38, will rotate the slotted holders 23 a half turn and reverse the card. To prevent the holders from becoming disconnected from the cards during this rotation, I provide side arms 90, 90, which extend around the holder 23 and pinion 40 so that as the holder rotates it cannot move away from the card.

In order to return the push pins 26 and 27 to normal position, I provide the lever arm 41 mounted on the pin 42, and the upper end of this lever 41 is engaged by the depending arms 43 on the shaft 44. This shaft 44 carries a separate arm 46 for each push pin 27 which lies in engagement with the stud 45 on each of these push pins. The pushing in of the pins 27 carries the lever arms 41 in the pathway of the arm 24 which carries the slotted holders 23, and as the slotted holders 23 and the arm 24 are returned to normal by turning back the hand crank 32, the levers 41 rock the shaft 44 which, in turn, carries back the push pin 27 to its normal position. Each of the arms 46 is also coupled by links 47 to the depending portion 30 of the push pins 26, so that if an upper push pin has been actuated the return of the card carrier will in the same way return to normal position, the push pins 26. The return of the push pins 26 to their normal position, does not return the rack bar 38 as the studs 33 only contact on one side with the arms 34, and so long as the upper row of push pins is used, the rack remains depressed so as to be engaged by the pinion 40.

The arms 34 are extended downward from the rock shaft 35, as indicated by dotted lines in Fig. 5, so as to be in the pathway of the studs 45 on the pins 27, and when any push pin of the lower row is operated, the contact of the stud 45 thereon with the depending portion of the arm 34 will rock the shaft 35, and raise up the rack bar 38 so that the pinion 40 will not be engaged thereby, and the selected card will not be reversed.

Having thus selected and presented at the sight opening 5, the proper card containing the computations, it will next be necessary to ascertain the amount of wages for the particular time selected. The mechanism for selecting the time is mounted in the upper portion of the front half of the casing.

50 is a fixed scale secured along the edge of the sight opening 51 under the protecting glass 5. This scale is graduated for a period of twelve hours and into five minute spaces for each hour. The hours are marked on the scale to indicate the hours of the day from 6:00 or 7:00 a. m., to 6:00 or 7:00., p. m., or otherwise as the case may be, and the hours are also marked from one to twelve. 52 is a pointer slidable along this scale, the pointer and its sliding attachments being best illustrated in Figs. 10, 11 and 12. The pointer is secured to a block 53 which extends across the top plate 4 of the front portion of the machine, and the block carries the guide portion 54 which is inserted in and rides back and forth in the slot 55 in the top plate 4. The transverse block 53 is divided into an upper and lower section 56, 57, and the two sections slide on the top plate 4, the one above and the other underneath the plate. The two sections 56 and 57 are provided with horizontal slots 59, 60 and the upper portion is also provided with the segmental slot 61, through its top plate and the lower section 57 is provided with a dovetailed groove 62 running lengthwise of the section.

63 is a lever pivoted on the pin 64 at the outer end of the guide portion 54, and this lever is rocked by the handle 65 secured on the inner end thereof, which passes up through the slot 61. At its lower end the pin 64 carries another lever 66 which enters the slot 60, and has a slotted connection with the block 67, mounted in the groove 62 to slide transversely, and the lower end of this block 67 has projecting an L-shaped stud 68. It will be evident from this construction that as the handle 65 is moved back and forth, that the L-shaped block 68 will be moved transversely along the lower face of the slide construction.

Affixed to the pointer 52 is a bar 69, which carries a second pointer 70 adjustable thereon by the handle 71. This bar is graduated into five minute periods. Normally the pointer 70 is pushed up to register with the pointer 52, and if in making use of the machine the number of hours and minutes are to be calculated from the first hour shown on the fixed scale 50, until some later time, say eleven o'clock, the pointer is merely moved to the desired hour and the five minute period indicated on the fixed scale 50, and the pointer will then be directly over the amount indicated on the proper rate of wages card for that particular period of time. If the time to be calculated must omit some recess period such as thirty minutes for lunch, the pointer 70 is moved on the scale 69 to the thirty minute mark, and the party making the calculation proceeds as before, but intsead of reading from the pointer 52 on the card he reads from the pointer 70. Now if it happens, however, that the time is not to be calculated from the first hour shown on the fixed scale 50, but say from nine o'clock until 2:30 the operator slides the pointers 52 and 70 which are normally together, back to the nine o'clock hour, and then he moves over the handle 65 toward the front of the machine as far as it will go.

Mounted in a grooved plate 72 secured underneath the top plate 4, and parallel thereto, with the grooves 73 running from side to side of the machine, and parallel to the front wall are a series of sliding racks 74, 74, one rack for each groove and each rack 74 provided with twelve slots 75, one between each tooth and corresponding to the five minute periods of the scale 50. Each of these racks 74 has a transverse lug 76 at each end, and extending in opposite directions so that as the racks are pulled out they will become coupled to each other, and the inner-most rack has secured to it a pointer 77, like the pointer 52, and this pointer 77 is also provided with a sliding bar 78, carrying another pointer 79 with the scale of five minute periods graduated on the bar 78, and the bar 78 normally carried with the handle so that the two pointers 77 and 79 coincide.

Now when the wages are to be calculated from some hour later than the commencement of the scale, when the operator moves the handle 65 it will cause the L-shaped lug 68 to engage in one of the slots of one of the sliding racks 74, and will thus couple the main slide 53 to the pointer 77. The main pointer 52 is then moved to the proper time on the fixed scale 50, but the reading is taken from the pointer 77. In the same way for the lapsed time, in this event the pointer 79 is adjusted for this interval and the reading taken from the pointer 79.

As soon as each computation is taken down from the card as indicated by the pointer, the operator moves back the handle 65 to normal position and the racks being thus released, those that have been moved are returned to their normal position by the descent of the weight 83, which is mounted on the flanged roller 84 riding on the inclined track 85, the end of the innermost rack being secured by a cord 81 running over the fixed pulley 82 to this weight. It will, of course, be understood that a spring of any suitable kind may be substituted for the weight. The operation of my calculator will be evident from the foregoing description: Let us assume that the user desires to ascertain the amount due on a number of time cards of workmen at different rates of wages, and for varying periods of time. The operator first presses in the push button 28 or 29 which indicates the rate of wages, and then turns the knobs 10 toward him until the cylindrical holder carrying the computation cards is stopped. As above described, the holder will stop with the proper card resting in the slotted holders 23. The operator then turns the hand crank 32, which carries forward the proper card under the sight window 5, the card being reversed if any push buttons in the upper row have been actuated and not reversed in case the selected rate of wages is found on the lower row of push buttons, and such push button has been actuated.

As it very rarely happens that the computation desired will extend beyond the twelve hour period, in order that only the two lower rows of computations shall ordinarily be visible through the window 5, I provide the sliding cover 91 which ordinarily conceals the two upper rows of computations on the card, but which cover can be pushed back into the case when desired.

The operator having adjusted the pointer 70 for the amount of time to be taken out, then for all the computations which are to be figured from the first hour on the fixed scale, the operator merely slides the pointer 52 to the time indicated and takes down the amount shown on the computation card opposite either the pointers 52 or 70 depending on whether any time is to be omitted for the period for which the wages are to be calculated.

For all those computations to be made where the party has not commenced at the commencement hour of the scale, the operator has to actuate the handle 65 to connect the slide with the racks which carry the pointers 77 and 79. With each of these calculations, the operator pushes back the handle 65 as shown, after the proper amount has been read from the card, and he then proceeds as before in connection with the next calculation.

While I have illustrated and described my calculator in connection with the calculation of wages, it will be evident that the same construction of the apparatus could be readily used for the calculation of interest by merely substituting interest cards for wage calculation cards, and the substitution of a different scale from the one illustrated herein.

Having thus described my invention what I claim as new and desire to secure by Letters Patent, is:

1. In a device of the character specified, the combination with a fixed scale, of a movable holder, and a series of cards, provided with computations at a predetermined rate for each card imprinted on said cards on front and reverse side, said cards being mounted in said holder, a series of stops one for each card to stop the holder at the delivery position for said selected card and means for transferring the selected card with front or reverse side into alinement with said fixed scale.

2. In a device of the character specified, a rotatable holder provided with radial slots, with a series of computation cards loosely carried in said slots, a cylinder mounted parallel to and geared with said holder, said cylinder provided with a series of stops one for each card, and a series of rods one for each stop arranged to be projected into the pathway of said slots to stop the rotation of the holder at any desired point.

3. In a device of the character specified, a rotatable holder provided with radial slots, with a series of computation cards loosely carried in said slots, the computations being provided for both faces of said cards, a cylinder mounted parallel to and geared with said holder, said cylinder provided with a series of stops two for each card, and a series of rods one for each stop arranged to be projected into the pathway of said slots to stop the rotation of the holder at any desired point, means for withdrawing the selected card from the holder, means for reversing the card and mechanism connecting the reversing mechanism with the series of rods under control of the operator whereby the reversing mechanism may be actuated to reverse the cards containing the desired computations on the reverse side thereof.

4. In a device of the character specified, the combination with a fixed scale, a series of cards provided with computations at a predetermined rate for each card and means for locating any desired card with reference to said scale, of a sliding pointer, adapted to be moved with reference to the scale and an auxiliary pointer mounted in connection with and movable with reference to the main pointer for intervals to be omitted from the fixed scales.

5. In a device of the character specified, the combination with a fixed scale, a series of cards provided with computations at a predetermined rate for each card, and means for locating any desired card with reference to said scale, of a pair of sliding pointers, adapted to be moved with reference to the fixed scale and means for coupling said pointers together at any desired position as and for the purpose described.

WILLIAM S. JOHNS.

Witnesses:
R. P. HARGITT,
BESSIE A. BEALL.